United States Patent
Liu et al.

(10) Patent No.: US 9,348,776 B2
(45) Date of Patent: May 24, 2016

(54) RECEIVER AND METHOD FOR DATA PROCESSING

(71) Applicant: HUAWEI TECHNOLOGIES CO., LTD., Shenzhen (CN)

(72) Inventors: Yu Liu, Shanghai (CN); Ying Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 14/087,534

(22) Filed: Nov. 22, 2013

(65) Prior Publication Data

US 2014/0149626 A1 May 29, 2014

(30) Foreign Application Priority Data

Nov. 23, 2012 (CN) .......................... 2012 1 0483092

(51) Int. Cl.
*G06F 13/36* (2006.01)
*G06F 13/28* (2006.01)

(52) U.S. Cl.
CPC ...................................... *G06F 13/28* (2013.01)

(58) Field of Classification Search
None
See application file for complete search history.

(56) References Cited

U.S. PATENT DOCUMENTS

| | | | | |
|---|---|---|---|---|
| 8,782,496 B2 * | 7/2014 | Sakaue | ............... | G06F 11/1048 714/773 |
| 2011/0007729 A1 | 1/2011 | Nogami et al. | | |
| 2011/0145670 A1 | 6/2011 | Fan et al. | ...................... | 714/748 |
| 2013/0215941 A1 * | 8/2013 | Cho | ...................... | H04L 1/1845 375/222 |

FOREIGN PATENT DOCUMENTS

| | | |
|---|---|---|
| CN | 101047475 A | 10/2007 |
| CN | 101789846 A | 7/2010 |
| CN | 102546082 A | 7/2012 |
| WO | WO2012/060559 | 5/2012 |

OTHER PUBLICATIONS

Chinese Office Action issued on Dec. 3, 2014 in corresponding Chinese Patent Application No. 201210483092.4.

* cited by examiner

*Primary Examiner* — Henry Tsai
*Assistant Examiner* — Juanito Borromeo
(74) *Attorney, Agent, or Firm* — Staas & Halsey LLP

(57) ABSTRACT

The present invention discloses a receiver and a method for data processing. The receiver includes a system on chip and a memory, where the system on chip is connected to the memory through an external buffer bus; the system on chip includes an LLR subsystem, a controller, a rate matching module, an incremental redundancy IR reconstructing module, and a combiner, where the LLR subsystem is connected to the controller and the rate matching module respectively; the controller is connected to the IR reconstructing module, and the rate matching module and the IR reconstructing module are connected to the combiner respectively; and the controller stores LLR data currently corresponding to a data block demodulated by the LLR subsystem into a memory, and read LLR data historically corresponding to the data block and stored in the memory into the IR reconstructing module when the data block is a retransmitted data block.

11 Claims, 5 Drawing Sheets

RECEIVER AND METHOD FOR DATA PROCESSING

CROSS-REFERENCE TO RELATED APPLICATIONS

This application claims priority to Chinese Patent Application No. 201210483092.4, filed on Nov. 23, 2012, which is hereby incorporated by reference in its entirety.

TECHNICAL FIELD

The present invention relates to the field of communication technologies, and in particular, to a receiver and a method for data processing.

BACKGROUND

To overcome fading of wireless channels, an HARQ (Hybrid Automatic Repeat Request, hybrid automatic repeat request) mechanism is introduced at the physical layer of mobile communications. In the HARQ mechanism, if a receiver finds that a received data block is errored, the receiver requests a transmitter to retransmit the data block. Then, the receiver performs IR (Incremental Redundancy, incremental redundancy) processing on the data block retransmitted by the transmitter and the historically errored data block to improve the quality of receiving the data block.

IR processing in the HARQ mechanism means that the receiver must buffer errored data blocks historically received by the receiver in a place referred to as an IR buffer. In the prior art, the IR buffer is arranged in a SoC(System on Chip, system on chip) of the receiver, but the IR buffer, whose size is increased rapidly along with the increase of the air interface communication rate, which can reach 10 Mbit or above, may occupy over 20% of the SoC area, thereby increasing the cost of the SoC and cost of the receiver.

SUMMARY

To solve the problem in the prior art, embodiments of the present invention provide a receiver and a method for data processing. The technical solutions are as follows:

In one aspect, an embodiment of the present invention provides a receiver, where the receiver includes a system on chip and a memory, where the system on chip is connected to the memory through an external buffer bus;

the system on chip includes a logarithmic likelihood ratio LLR subsystem, a controller, a rate matching module, an incremental redundancy IR reconstructing module, and a combiner, where the LLR subsystem is connected to the controller and the rate matching module respectively, the controller is further connected to the IR reconstructing module, and the rate matching module and the IR reconstructing module are connected to the combiner respectively;

the LLR subsystem is configured to demodulate a currently received data block sent from a transmitter to obtain LLR data currently corresponding to the data block, and output the LLR data currently corresponding to the data block to the rate matching module;

the controller is configured to store the LLR data currently corresponding to the data block demodulated by the LLR subsystem into the memory;

the controller is further configured to read LLR data historically corresponding to the data block and stored in the memory into the IR reconstructing module when the data block is a data block retransmitted by the transmitter;

the rate matching module is configured to perform rate matching on the LLR data currently corresponding to the data block and output by the LLR subsystem to obtain a first processing result, and output the first processing result to the combiner;

the IR reconstructing module is configured to perform rate matching and combination processing on the LLR data historically corresponding to the data block and read by the controller to obtain a second processing result, and output the second processing result to the combiner; and the combiner is configured to combine the first processing result output by the rate matching module and the second processing result output by the IR reconstructing module.

The controller is specifically configured to store, according to a preset first control parameter, the LLR data currently corresponding to the data block demodulated by the LLR subsystem into the memory, where the first control parameter includes at least one of storage address, data block size, and frequency.

The controller is specifically configured to read, according to a preset second control parameter, the LLR data historically corresponding to the data block and stored in the memory into the IR reconstructing module, where the second control parameter includes at least one of data block size and frequency.

The controller is further configured to manage the memory, where the management includes maintenance of a currently available address space of the memory.

The rate matching module is specifically configured to: output the first processing result to the combiner continuously; and if receiving a suspend command from the combiner during the output process, suspend outputting the first processing result, and when receiving a cancel suspend command from the combiner, continue to output the first processing result to the combiner.

The IR reconstructing module is specifically configured to: output the second processing result to the combiner continuously; and if receiving a suspend command from the combiner during the output process, suspend outputting the second processing result, and when receiving a cancel suspend command from the combiner, continue to output the second processing result to the combiner.

The combiner is specifically configured to: determine whether a data output rate of the rate matching module matches a data output rate of the IR reconstructing module; and when the data output rate of the rate matching module does not match the data output rate of the IR reconstructing module, send a suspend command to a party having a lower data output rate, so that the party having a lower data output rate suspends the data output, thereby ensuring that the data output rate of the rate matching module matches the data output rate of the IR reconstructing module.

In another aspect, an embodiment of the present invention further provides a method for data processing, including:

demodulating a currently received data block sent from a transmitter to obtain LLR data currently corresponding to the data block;

storing the LLR data currently corresponding to the data block into a memory, and reading LLR data historically corresponding to the data block from the memory when the data block is a data block retransmitted by the transmitter;

performing rate matching on the LLR data currently corresponding to the data block to obtain a first processing result, and performing rate matching and combination processing on the LLR data historically corresponding to the data block to obtain a second processing result; and combining the first processing result and the second processing result.

The storing the LLR data currently corresponding to the data block into a memory includes:

storing, according to a preset first control parameter, the LLR data currently corresponding to the data block into the memory, where the first control parameter includes at least one of storage address, data block size, and frequency.

The reading LLR data historically corresponding to the data block from the memory includes:

reading, according to a preset second control parameter, the LLR data historically corresponding to the data block and stored in the memory, where the second control parameter includes at least one of data block size and frequency.

The technical solutions provided by the embodiments of the present invention bring the following benefits: A system on chip is connected to a memory through an external buffer bus, so that the memory is moved to an external buffer of the system on chip, for example, a DDR memory, which can greatly reduce the cost of the system on chip. In addition, an LLR subsystem demodulates a received data block, and a controller stores LLR data currently corresponding to the data block into the memory. Because the LLR data currently corresponding to the data block is highly compact, the data amount of a single storage can be reduced, and thereby a data bandwidth required by the system on chip to access the external memory is reduced.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from the accompanying drawing without creative efforts.

DESCRIPTION OF EMBODIMENTS

To make the objectives, technical solutions, and advantages of the present invention clearer, embodiments of the present invention are hereinafter described in detail with reference to the accompanying drawings.

Figure 1:
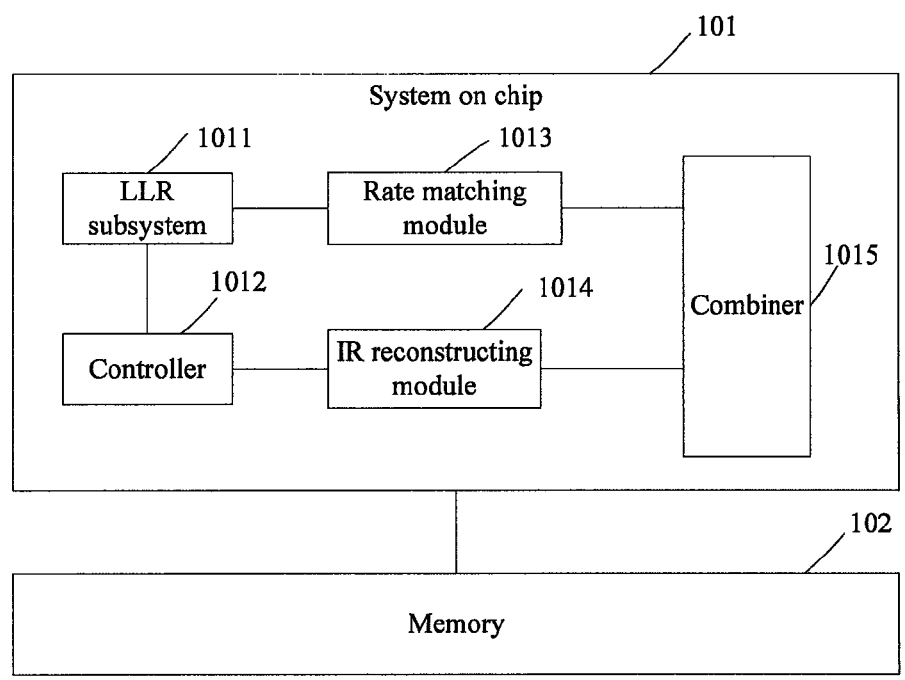
FIG. 1 is a device structural diagram of a receiver according to an embodiment of the present invention.

FIG. 1 illustrates a receiver according to an embodiment of the present invention. The receiver may specifically include a system on chip (System on Chip, abbreviated as SoC) 101 and a memory 102, where the system on chip 101 is connected to the memory 102 through an external buffer bus.

Specifically, the system on chip 101 may include a logarithmic likelihood ratio (Logarithmic likelihood ratio, abbreviated as LLR) subsystem 1011, a controller 1012, a rate matching module 1013, an incremental redundancy (Incremental redundancy, abbreviated as IR) reconstructing module 1014, and a combiner 1015. The LLR subsystem 1011 is connected to the controller 1012 and the rate matching module 1013 respectively. The controller 1012 is further connected to the IR reconstructing module 1014. The rate matching module 1013 and the IR reconstructing module 1014 are connected to the combiner 1015 respectively.

In the embodiment of the present invention, the LLR subsystem 1011 is configured to demodulate a currently received data block sent from a transmitter to obtain LLR data currently corresponding to the data block, and output the LLR data currently corresponding to the data block to the rate matching module 1013.

The controller 1012 is configured to store the LLR data currently corresponding to the data block demodulated by the LLR subsystem 1011 into the memory 102.

The controller 1012 is further configured to read LLR data historically corresponding to the data block and stored in the memory 102 into the IR reconstructing module 1014 when the data block is a data block retransmitted by the transmitter.

The rate matching module 1013 is configured to perform rate matching on the LLR data currently corresponding to the data block and output by the LLR subsystem 1011 to obtain a first processing result, and output the first processing result to the combiner 1015.

The IR reconstructing module 1014 is configured to perform rate matching and combination processing on the LLR data historically corresponding to the data block and read by the controller 1012 to obtain a second processing result, and output the second processing result to the combiner 1015.

The combiner 1015 is configured to combine the first processing result output by the rate matching module 1013 and the second processing result output by the IR reconstructing module 1014.

In the embodiment of the present invention, a system on chip is connected to a memory through an external buffer bus, so that the memory is moved to an external buffer of the system on chip, for example, a DDR memory, which can greatly reduce the cost of the system on chip. In addition, an LLR subsystem demodulates a received data block, and a controller stores LLR data currently corresponding to the data block into the memory. Because the LLR data currently corresponding to the data block is highly compact, the data amount of a single storage can be reduced, and thereby a data bandwidth required by the system on chip to access the external memory is reduced.

Figure 2:
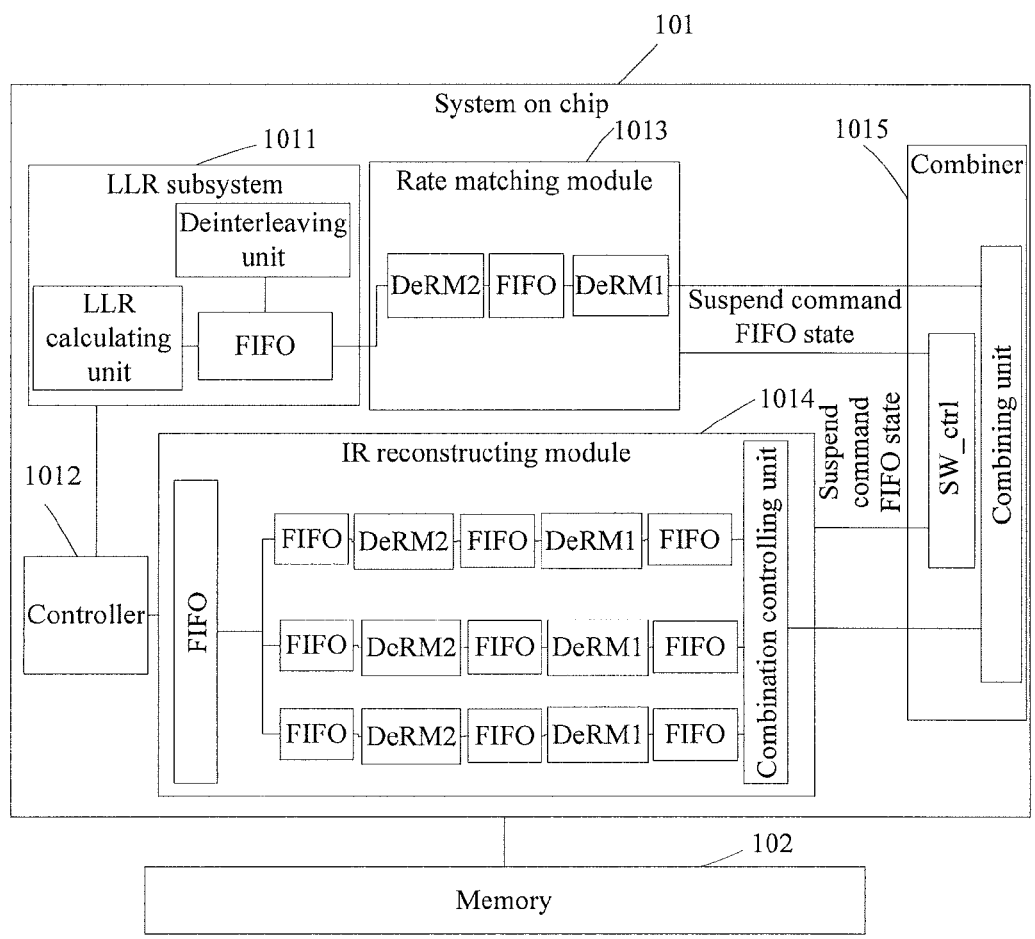
FIG. 2 is a device structural diagram of a receiver according to an embodiment of the present invention.

FIG. 2 is a schematic diagram illustrating an internal structure of a receiver according to an embodiment of the present invention. An LLR subsystem 1011 includes an LLR calculating unit, a deinterleaving unit, and a first in first out (FIFO) unit. The LLR calculating unit may be specifically configured to perform LLR calculation on a currently received data block sent from a transmitter to obtain LLR data currently corresponding to the data block, and output the LLR data currently corresponding to the data block to the FIFO unit; and the deinterleaving unit is configured to perform deinterleaving processing on the LLR data currently corresponding to the data block and calculated by the LLR calculating unit, and use a deinterleaving result as final LLR data currently corresponding to the data block.

A controller 1012 is specifically configured to store, according to a preset first control parameter, the LLR data currently corresponding to the data block demodulated by the LLR subsystem 1011 into a memory 102, where the first control parameter includes at least one of storage address, data block size, and frequency.

The controller 1012 is specifically configured to read, according to a preset second control parameter, LLR data historically corresponding to the data block and stored in the memory 102 into an IR reconstructing module 1014, where the second control parameter includes at least one of data block size and frequency.

In the embodiment of the present invention, a controller stores highly compact LLR data currently corresponding to a data block into a memory, which can reduce the data amount of a single storage and enables the memory to store much more data by using the same storage space. In addition, when the controller read LLR data historically corresponding to the data block and stored in the memory into an IR reconstructing module, a data bandwidth required by a system on chip to access an external memory can be reduced.

A rate matching module 1013 is configured to: when receiving the LLR data currently corresponding to the data block and output by the LLR subsystem 1011, perform rate matching twice on the received LLR data currently corresponding to the data block, and output rate matching results to a combiner 1015; or when receiving the LLR data currently corresponding to the data block and output by the LLR subsystem 1011 and an operation instruction from the controller 1012, perform rate matching twice on the received LLR data corresponding to the data block, and output rate matching results to the combiner 1015.

The rate matching module 1013 may specifically include a first rate matching unit DeRM2, a FIFO unit, and a second rate matching unit DeRM1, where the first rate matching unit is configured to perform rate matching on the LLR data currently corresponding to the data block and output by the LLR subsystem 1011 to obtain a first rate matching result, and output the first rate matching result to the FIFO unit; and the second rate matching unit is configured to perform rate matching on the first rate matching result output by the FIFO unit to obtain a second rate matching result. In the embodiment of the present invention, the second rate matching result is used as a first processing result output to the combiner 1014.

Further, during the specific implementation of the embodiment of the present invention, the rate matching module 1013 is configured to: output the first processing result to the combiner 1015 continuously; and if receiving a suspend command from the combiner 1015 during the output process, suspend outputting the first processing result, and when receiving a cancel suspend command, continue to output the first processing result to the combiner 1015.

The IR reconstructing module 1014 adopts an IR reconstructing mechanism based on a FIFO interface and is configured to: when receiving the LLR data historically corresponding to the data block and read by the controller, perform rate matching twice on the received LLR data historically corresponding to the data block, and output rate matching results to the combiner 1015, or when receiving the LLR data historically corresponding to the data block and read by the controller and an operation instruction from the controller 1012, perform rate matching twice on the received LLR data historically corresponding to the data block, and output rate matching results to the combiner 1015.

The IR reconstructing module 1014 may specifically include multiple processing branches, where the multiple processing branches are connected to a combination controlling unit respectively. Each processing branch performs rate matching twice on the LLR data historically corresponding to the data block and may include multiple FIFO units, a first rate matching unit DeRM2, and a second rate matching unit DeRM1. Specifically, the FIFO units are configured to buffer data flowing along a processing branch; the first rate matching unit is configured to perform rate matching on the LLR data historically corresponding to the data block and read by the controller 1012 to obtain a first rate matching result, and output the first rate matching result to the second rate matching unit through a FIFO unit; the second rate matching unit is configured to perform rate matching on the first rate matching result to obtain a second rate matching result, and output the second rate matching result to the combination controlling unit through a FIFO unit; the combination controlling unit combines the second rate matching results output by each processing branch, and then uses the combined result as a final second processing result output to the combiner 1015.

Further, during the specific implementation of the embodiment of the present invention, the IR reconstructing module 1014 is specifically configured to: output the second processing result to the combiner 1015 continuously; and if receiving a suspend command from the combiner 1015 during the output process, suspend outputting the second processing result, and when receiving a cancel suspend command from the combiner 1015, continue to output the second processing result to the combiner 1015.

During the specific implementation of the embodiment of the present invention, the combiner 1015 includes a rate controlling unit SW_ctrl and a combining unit, where the SW_ctrl is configured to: determine whether a data output rate of the rate matching module 1013 matches a data output rate of the IR reconstructing module 1014; and when the data output rate of the rate matching module 1013 does not match the data output rate of the IR reconstructing module 1014, send a suspend command to a party having a lower data output rate, so that the party having a lower data output rate suspends the data output, thereby ensuring that the data output rate of the rate matching module 1013 matches the data output rate of the IR reconstructing module 1014. The combining unit combines the first processing result output by the rate matching module 1013 and the second processing result output by the IR reconstructing module 1014.

Specifically, the determining, by the SW_ctrl, whether a data output rate of the rate matching module 1013 matches a data output rate of the IR reconstructing module 1014 includes: reading states of the FIFO units in the rate matching module 1013 and the IR reconstructing module 1014, and determining whether the data output rate of the rate matching module 1013 matches the data output rate of the IR reconstructing module 1014 according to the two read states.

In the embodiment of the present invention, the combiner 1015 combines the LLR data currently corresponding to the data block and the LLR data historically corresponding to the data block to improve the quality of receiving the data block.

Figure 3:
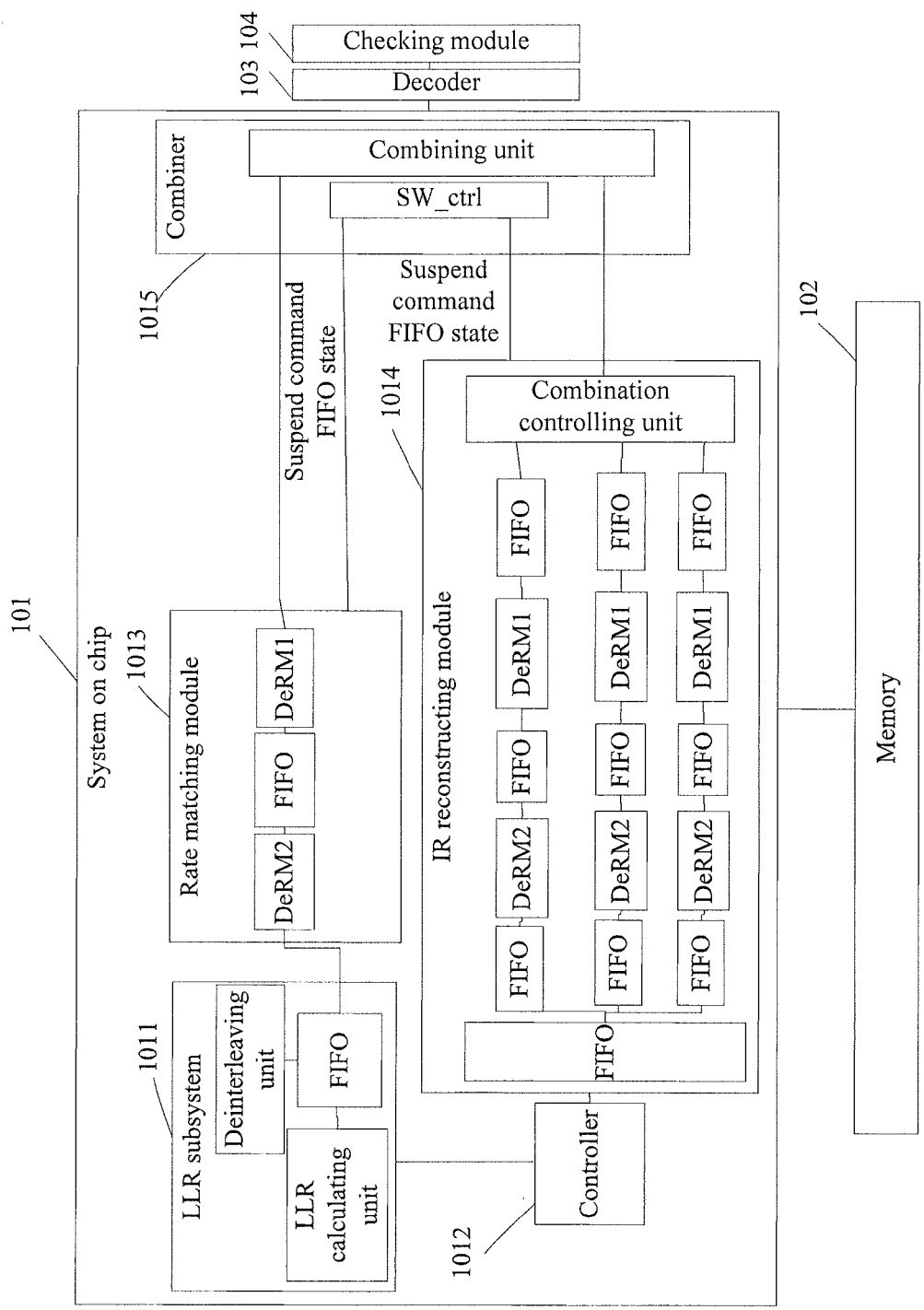
FIG. 3 is a device structural diagram of a receiver according to an embodiment of the present invention.

Further, referring to FIG. 3, the receiver illustrated in FIG. 2 in the embodiment of the present invention further includes a decoder 103 connected to the system on chip 101 and a checking module 104 connected to the decoder 103, where the decoder 103 decodes combined data obtained by the system on chip 101, and outputs a decoded result to the checking module 104; and the checking module 104 verifies the received decoded result. In the embodiment of the present invention, when the checking module 104 verifies that the decoded result is wrong, the receiver sends a retransmission request to the transmitter, requesting the transmitter to retransmit the data block.

Figure 4:
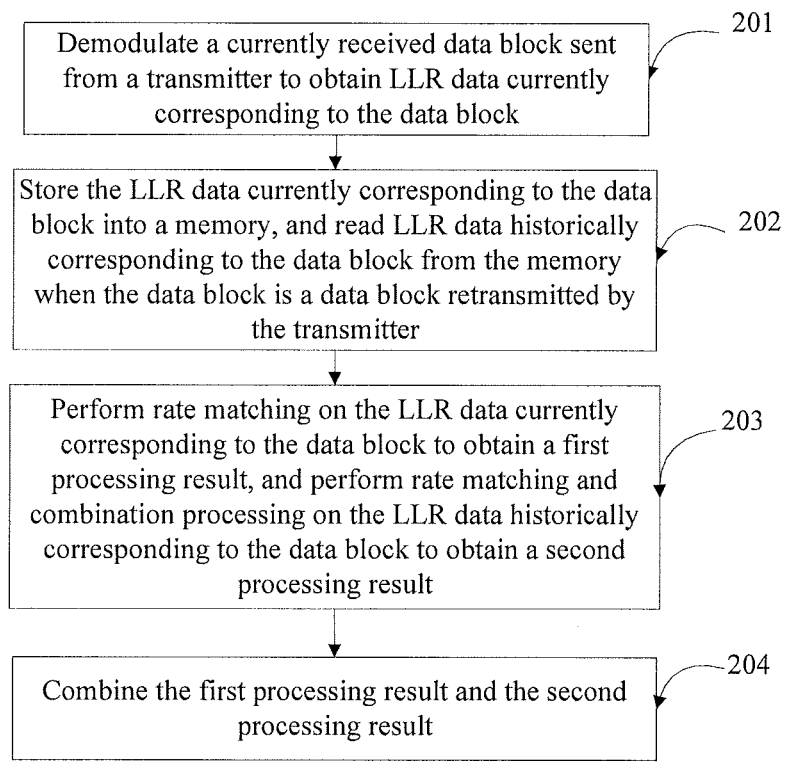
FIG. 4 is a flowchart of a method for data processing according to an embodiment of the present invention.

Referring to FIG. 4, based on the foregoing receiver, an embodiment of the present invention further provides a method for data processing, where the method includes the following operational steps:

Step 201: Demodulate a currently received data block sent from a transmitter to obtain LLR data currently corresponding to the data block.

Step 202: Store the LLR data currently corresponding to the data block into a memory, and read LLR data historically corresponding to the data block from the memory when the data block is a data block retransmitted by the transmitter.

Step 203: Perform rate matching on the LLR data currently corresponding to the data block to obtain a first processing result, and perform rate matching and combination processing on the LLR data historically corresponding to the data block to obtain a second processing result.

Step 204: Combine the first processing result and the second processing result.

In the embodiment of the present invention, a received data block is demodulated, and LLR data currently corresponding to the data block is stored into a memory; because the LLR data currently corresponding to the data block is highly compact, the data amount of a single storage can be reduced. In addition, when LLR data historically corresponding to the data block is read from the memory, a data bandwidth for accessing the memory can be further reduced.

Figure 5:
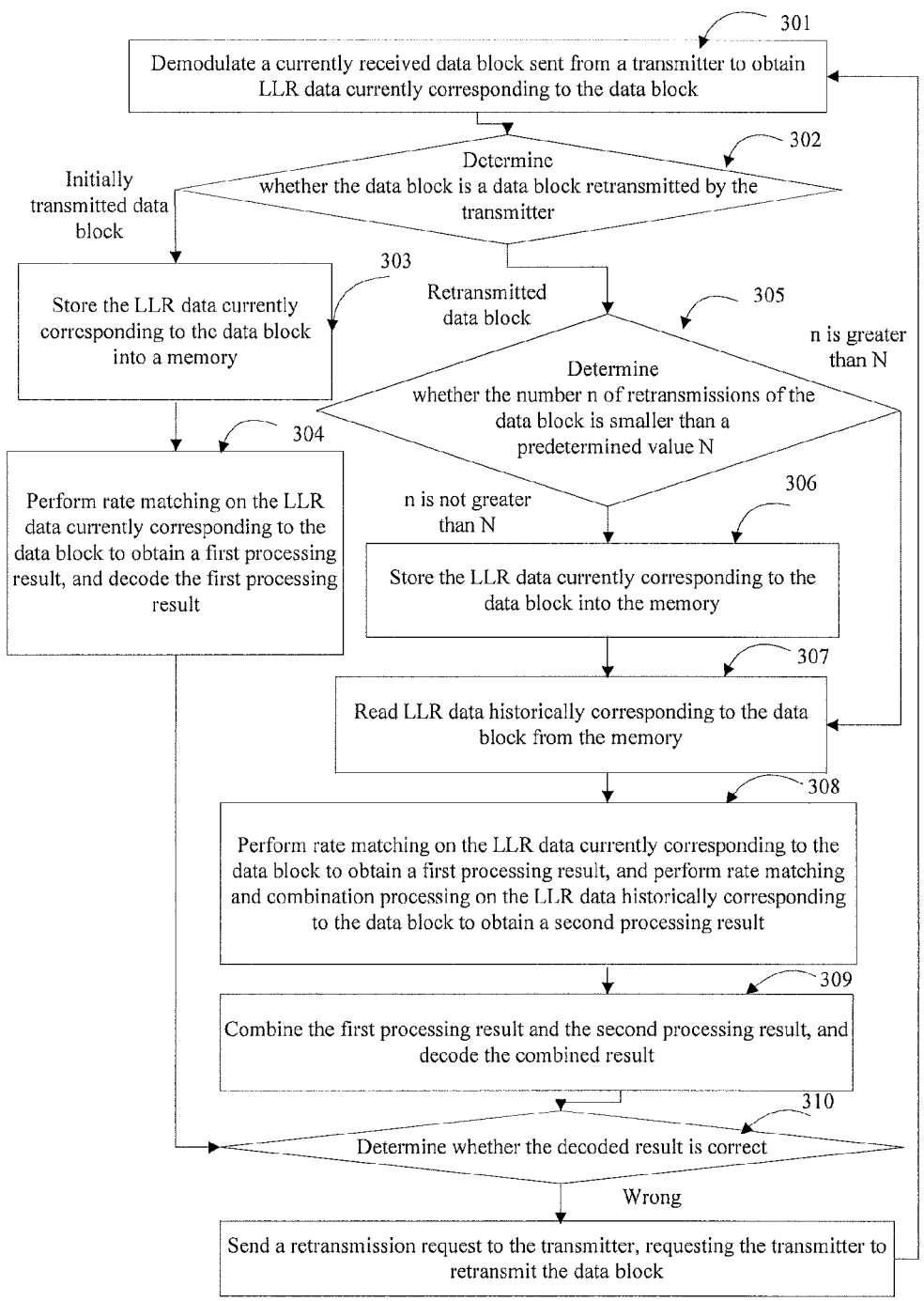
FIG. 5 is a flowchart of a method for data processing according to an embodiment of the present invention.

The following describes in detail a data processing process implemented by the receiver with reference to specific embodiments and the foregoing receiver. Referring to FIG. 5, a method for data processing includes:

Step 301: Demodulate a currently received data block sent from a transmitter to obtain LLR data currently corresponding to the data block.

Specifically, LLR calculation is performed on the currently received data block sent from the transmitter to obtain LLR data currently corresponding to the data block.

Step 302: Determine whether the data block is a data block retransmitted by the transmitter.

When the data block is a data block initially transmitted by the transmitter, step 303 is performed.

When the data block is a data block retransmitted by the transmitter, step 305 is performed.

Specifically, the data block is parsed to obtain a retransmission indication identifier T carried in the data block, where the retransmission indication identifier T is used to indicate whether the data block is transmitted for the first time or is retransmitted. For example, if T=0, the data block is a data block transmitted by the transmitter for the first time; if T=1, the data block is a data block retransmitted by the transmitter for the first time; if T=2, the data block is a data block transmitted by the transmitter for the second time, and the like.

Step 303: Store the LLR data currently corresponding to the data block into a memory.

Specifically, the LLR data currently corresponding to the data block is stored into the memory according to a preset first control parameter, where the first control parameter includes at least one of storage address, data block size, and frequency.

Step 304: Perform rate matching on the LLR data currently corresponding to the data block to obtain a first processing result, and decode the first processing result. Then, step 310 is performed.

Specifically, rate matching is performed twice on the LLR data currently corresponding to the data block, and two rate matching results are used as the first processing result.

In the embodiment of the present invention, the sequence of step 303 and step 304 is not limited.

Step 305: Determine whether the number n of retransmissions of the data block is smaller than a predetermined value N.

When the number n of retransmissions of the data block is not greater than the predetermined value N, step 306 is performed.

When the number n of retransmissions of the data block is greater than the predetermined value N, step 307 is performed.

Step 306: Store the LLR data currently corresponding to the data block into the memory. For details about this step, refer to step 303, which is not described herein again.

Step 307: Read LLR data historically corresponding to the data block from the memory, specifically, read n pieces of LLR data historically corresponding to the data block from the memory.

Specifically, the LLR data historically corresponding to the data block and stored in the memory is read according to a preset second control parameter, where the second control parameter includes at least one of data block size and frequency.

Step 308: Perform rate matching on the LLR data currently corresponding to the data block to obtain a first processing result, and perform rate matching and combination processing on the LLR data historically corresponding to the data block to obtain a second processing result.

For details about how rate matching is performed on the LLR data currently corresponding to the data block, refer to step 304, which is not described herein again.

The performing rate matching and combination processing on the LLR data historically corresponding to the data block includes: performing rate matching twice on the LLR data historically corresponding to the data block respectively, combining rate matching results, and using the combined result as the second processing result.

Step 309: Combine the first processing result and the second processing result, and decode the combined result.

Step 310: Determine whether the decoded result is correct.

When the decoded result is correct, the operation ends.

When the decoded result is wrong, a retransmission request is sent to the transmitter, requesting the transmitter to retransmit the data block. Then, step 301 is performed again.

In the embodiment of the present invention, a received data block is demodulated, and LLR data currently corresponding to the data block is stored into a memory; because the LLR data currently corresponding to the data block is highly compact, the data amount of a single storage can be reduced. In addition, when LLR data historically corresponding to the data block is read from the memory, a data bandwidth for accessing the memory can be further reduced.

It should be noted that when the receiver provided in the foregoing embodiment performs data processing, only the division of the above functional modules is used as an example for description. In the actual applications, the above functions may be implemented by different functional modules according to the actual need, that is, different functional modules are divided according to the internal structure of the receiver to complete the above all or some functions. In addition, the receiver provided in the foregoing embodiment belongs to the same idea as the embodiment of the method for data processing. For details about the specific implementation process of the receiver, refer to the embodiment of the method, which is not described herein again.

The sequence numbers of the foregoing embodiments of the present invention are merely for the description purpose but do not indicate the preference of the embodiments.

It is understandable to persons of ordinary skill in the art that all or part of the steps in the methods according to the foregoing embodiments may be performed by hardware or by hardware instructed by a program. The program may be stored in a computer readable storage medium, where the storage medium may be a read-only memory, a magnetic disk, or an optical disk.

The above descriptions are merely exemplary embodiments of the present invention, but not intended to limit the present invention. Any modification, equivalent replacement, and improvement made without departing from the spirit and scope of the present invention shall fall within the protection scope of the present invention.

What is claimed is:

1. A receiver, comprising a system on chip and a memory, wherein: the system on chip is connected to the memory through an external buffer bus; and
    the system on chip comprises a logarithmic likelihood ratio (LLR) subsystem, a controller, a rate matching module, an incremental redundancy IR reconstructing module, and a combiner, wherein the LLR subsystem is connected to the controller and the rate matching module respectively, the controller is further connected to the IR reconstructing module, and the rate matching module and the IR reconstructing module are connected to the combiner respectively;
    the LLR subsystem is configured to demodulate a currently received data block sent from a transmitter to obtain LLR data currently corresponding to the data block, and output the LLR data currently corresponding to the data block to the rate matching module;
    the controller is configured to store the LLR data currently corresponding to the data block demodulated by the LLR subsystem into the memory;
    the controller is further configured to read LLR data historically corresponding to the data block and stored in the memory into the IR reconstructing module when the data block is a data block retransmitted by the transmitter;
    the rate matching module is configured to perform rate matching on the LLR data currently corresponding to the data block and output by the LLR subsystem to obtain a first processing result, and output the first processing result to the combiner;
    the IR reconstructing module is configured to perform rate matching and combination processing on the LLR data historically corresponding to the data block and read by the controller to obtain a second processing result, and output the second processing result to the combiner; and
    the combiner is configured to combine the first processing result output by the rate matching module and the second processing result output by the IR reconstructing module, wherein the combiner is specifically configured to: determine whether a data output rate of the rate matching module matches a data output rate of the IR reconstructing module; when the data output rate of the rate matching module does not match the data output rate of the IR reconstructing module, send a suspend command to a party having a lower data output rate, so that the party having a lower data output rate suspends the data output, thereby ensuring that the data output rate of the rate matching module matches the data output rate of the IR reconstructing module, and when the data output rate of the rate matching module matches the data output rate of the IR reconstructing module, combine the first processing result and the second processing result.

2. The receiver according to claim 1, wherein the controller is specifically configured to store, according to a preset first control parameter, the LLR data currently corresponding to the data block demodulated by the LLR subsystem into the memory, wherein the first control parameter comprises at least one of storage address, data block size, and frequency.

3. The receiver according to claim 1, wherein the controller is specifically configured to read, according to a preset second control parameter, the LLR data historically corresponding to the data block and stored in the memory into the IR reconstructing module, wherein the second control parameter comprises at least one of data block size and frequency.

4. The receiver according to any one of claim 1, wherein the controller is further configured to manage the memory, wherein the management comprises maintenance of a currently available address space of the memory.

5. The receiver according to any one of claim 2, wherein the controller is further configured to manage the memory, wherein the management comprises maintenance of a currently available address space of the memory.

6. The receiver according to any one of claim 3, wherein the controller is further configured to manage the memory, wherein the management comprises maintenance of a currently available address space of the memory.

7. The receiver according to claim 1, wherein the rate matching module is specifically configured to: output the first processing result to the combiner continuously; and if receiving a suspend command from the combiner during the output process, suspend outputting the first processing result, and when receiving a cancel suspend command from the combiner, continue to output the first processing result to the combiner.

8. The receiver according to claim 1, wherein the IR reconstructing module is specifically configured to: output the second processing result to the combiner continuously; and
    if receiving a suspend command from the combiner during the output process, suspend outputting the second processing result, and when receiving a cancel suspend command from the combiner, continue to output the second processing result to the combiner.

9. A method for data processing on a receiver, wherein the receiver comprises a system on chip (SOC) and a memory, the SOC is connected to the memory through an external buffer bus; wherein the method comprising:
    demodulating, by the SOC, a currently received data block sent from a transmitter to obtain Logarithmic likelihood ratio (LLR) data currently corresponding to the data block;
    storing, by the SOC, the LLR data currently corresponding to the data block into a memory, and reading, by the SOC, LLR data historically corresponding to the data block from the memory when the data block is a data block retransmitted by the transmitter;
    performing, by the SOC, rate matching on the LLR data currently corresponding to the data block to obtain a first processing result, and performing, by the SOC, rate matching and combination processing on the LLR data historically corresponding to the data block to obtain a second processing result; and
    combining, by the SOC, the first processing result and the second processing result, comprises: determining whether a data output rate of the first processing result matches a data output rate of the second processing result; suspending the data output of a processing result having a lower data output rate between the first processing result and the second processing result when the data output rate of the first processing result does not match the data output rate of the second processing result; and combining the first processing result and the second processing result when the data output rate of the first processing result matches the data output rate of the second processing result.

10. The method according to claim 9, wherein the storing, by the SOC, the LLR data currently corresponding to the data block into a memory comprises:

storing, according to a preset first control parameter, the LLR data currently corresponding to the data block into the memory, wherein the first control parameter comprises at least one of storage address, data block size, and frequency.

11. The method according to claim 9, wherein the reading, by the SOC, LLR data historically corresponding to the data block from the memory comprises:

reading, according to a preset second control parameter, the LLR data historically corresponding to the data block and stored in the memory, wherein the second control parameter comprises at least one of data block size and frequency.

\* \* \* \* \*